(12) United States Patent
Lim et al.

(10) Patent No.: US 9,516,323 B2
(45) Date of Patent: *Dec. 6, 2016

(54) METHOD FOR DETERMINING COLOR DIFFERENCE COMPONENT QUANTIZATION PARAMETER AND DEVICE USING THE METHOD

(71) Applicant: ELECTRONICS AND TELECOMMUNICATIONS RESEARCH INSTITUTE, Daejeon (KR)

(72) Inventors: Sung Chang Lim, Daejeon (KR); Hui Yong Kim, Daejeon (KR); Se Yoon Jeong, Daejeon (KR); Jong Ho Kim, Daejeon (KR); Ha Hyun Lee, Seoul (KR); Jin Ho Lee, Daejeon (KR); Jin Soo Choi, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,189

(22) Filed: Apr. 25, 2016

(65) Prior Publication Data

US 2016/0241853 A1 Aug. 18, 2016

Related U.S. Application Data

(63) Continuation of application No. 14/001,024, filed as application No. PCT/KR2012/001620 on Mar. 5, 2012, now Pat. No. 9,363,509.

(30) Foreign Application Priority Data

Mar. 3, 2011 (KR) .......... 10-2011-0019152
Mar. 5, 2012 (KR) .......... 10-2012-0022531

(51) Int. Cl.
*H04N 19/124* (2014.01)
*H04N 19/186* (2014.01)
(Continued)

(52) U.S. Cl.
CPC .......... *H04N 19/124* (2014.11); *H04N 19/122* (2014.11); *H04N 19/157* (2014.11); *H04N 19/186* (2014.11); *H04N 19/46* (2014.11); *H04N 19/463* (2014.11)

(58) Field of Classification Search
CPC ............ H04N 19/124; H04N 19/157; H04N 19/186; H04N 19/463; H04N 19/0009; H04N 19/134; H04N 19/122; H04N 19/46
USPC .................................................. 375/240.03
See application file for complete search history.

(56) References Cited

U.S. PATENT DOCUMENTS 7,266,247 B2 9/2007 Kim et al.
7,492,950 B2 2/2009 Suzuki et al.
(Continued)

FOREIGN PATENT DOCUMENTS

JP 2011-259362 A 12/2011
JP 5385781 B2 10/2013
(Continued)

OTHER PUBLICATIONS

International Search Report issued Sep. 26, 2012 in corresponding International Patent Application No. PCT/KR2012/001620 (3 pages, in Korean).

*Primary Examiner* — Christopher S Kelley
*Assistant Examiner* — Kathleen Walsh
(74) *Attorney, Agent, or Firm* — NSIP Law

(57) ABSTRACT

Disclosed are a method for determining a color difference component quantization parameter and a device using the method. Method for decoding an image can comprise the steps of: decoding a color difference component quantization parameter offset on the basis of size information of a transform unit; and calculating a color difference component quantization parameter index on the basis of the decoded color difference component quantization parameter offset. Therefore, the present invention enables effective quantization by applying different color difference component quantization parameters according to the size of the transform unit when executing the quantization.

3 Claims, 10 Drawing Sheets

(51) Int. Cl.
  *H04N 19/463*   (2014.01)
  *H04N 19/157*   (2014.01)
  *H04N 19/122*   (2014.01)
  *H04N 19/46*    (2014.01)

(56) References Cited

U.S. PATENT DOCUMENTS

| | | |
|---|---|---|
| 7,630,435 B2 | 12/2009 | Chen et al. |
| 7,894,534 B2 | 2/2011 | Joch et al. |
| 8,139,636 B2 | 3/2012 | Sato et al. |
| 8,279,924 B2 | 10/2012 | Chen et al. |
| 8,798,159 B2 | 8/2014 | Han et al. |
| 9,363,509 B2 * | 6/2016 | Lim .................... H04N 19/463 |
| 2004/0028129 A1 | 2/2004 | Nagumo et al. |
| 2006/0018559 A1 | 1/2006 | Kim et al. |
| 2006/0023788 A1 | 2/2006 | Otsuka et al. |
| 2007/0092001 A1 | 4/2007 | Arakawa |
| 2007/0147497 A1 | 6/2007 | Bao et al. |
| 2007/0189626 A1 | 8/2007 | Tanizawa et al. |
| 2007/0257991 A1 | 11/2007 | Hsu |
| 2007/0291849 A1 | 12/2007 | Lainema |
| 2008/0008239 A1 | 1/2008 | Song |
| 2008/0089410 A1 | 4/2008 | Lu et al. |
| 2008/0317377 A1 | 12/2008 | Saigo et al. |
| 2009/0129466 A1 | 5/2009 | Cho et al. |
| 2009/0175334 A1 | 7/2009 | Ye et al. |
| 2009/0190829 A1 | 7/2009 | Suzuki et al. |
| 2009/0224950 A1 | 9/2009 | Xu et al. |
| 2009/0296809 A1 | 12/2009 | Yamori et al. |
| 2010/0086025 A1 | 4/2010 | Chen et al. |
| 2010/0202513 A1 | 8/2010 | Arakawa et al. |
| 2011/0096839 A1 | 4/2011 | Gomila et al. |
| 2011/0150080 A1 | 6/2011 | Watanabe et al. |
| 2012/0027092 A1 | 2/2012 | Matsui |
| 2012/0230405 A1 | 9/2012 | An et al. |
| 2013/0016772 A1 | 1/2013 | Matsunobu et al. |
| 2013/0051457 A1 | 2/2013 | Joshi et al. |
| 2013/0077676 A1 | 3/2013 | Sato |
| 2013/0329785 A1 * | 12/2013 | Lim .................... H04N 19/463 |
| | | 375/240.03 |
| 2014/0328393 A1 | 11/2014 | Han et al. |
| 2015/0071344 A1 | 3/2015 | Tourapis et al. |

FOREIGN PATENT DOCUMENTS

| | | |
|---|---|---|
| KR | 10-0973216 B1 | 7/2010 |
| WO | WO 2004/006558 A2 | 1/2004 |

* cited by examiner

METHOD FOR DETERMINING COLOR DIFFERENCE COMPONENT QUANTIZATION PARAMETER AND DEVICE USING THE METHOD

CROSS-REFERENCE TO RELATED APPLICATIONS

This application is a Continuation of U.S. patent application Ser. No. 14/001,024 filed on Aug. 22, 2013, which is a National Stage application of International Application No. PCT/KR2012/001620 filed Mar. 5, 2012, which claims benefit under 35 U.S.C. §119(a) of Korean Patent Application Nos. 10-2011-0019152 filed Mar. 3, 2011, and 10-2012-0022531 filed Mar. 5, 2012 in the Korean Intellectual Property Office, the contents of all of which are incorporated herein by reference in their entireties

TECHNICAL FIELD

The present invention relates to a picture encoding/decoding method, and more particularly, to a method of encoding/decoding a chrominance component quantization parameter and an apparatus using the same.

BACKGROUND ART

Recently, in accordance with the expansion of broadcasting services having high definition (HD) resolution in the country and around the world, many users have been accustomed to a high resolution and definition picture, such that many organizations have attempted to develop the next-generation picture devices. In addition, as the interest in HDTV and ultra high definition (UHD) having a resolution four times higher than that of HDTV have increased, a compression technology for a higher-resolution and higher-definition picture has been demanded.

For the picture compression, an inter prediction technology of predicting pixel values included in a present picture from a picture before and/or after the present picture, an intra prediction technology of predicting pixel values included in a present picture using pixel information in the present picture, an entropy encoding technology of allocating a short code to symbols having a high appearance frequency and a long code to symbols having a low appearance frequency, or the like, may be used.

An example of the picture compression technology may include a technology providing a predetermined network bandwidth under a limited operation environment of hardware, without considering a flexible network environment. However, in order to compress picture data applied to the network environment in which the bandwidth is frequently changed, a new compression technology is required. To this end, a scalable video encoding/decoding method may be used.

DISCLOSURE

Technical Problem

The present invention provides a quantization method for improving picture encoding/decoding efficiency.

The present invention also provides a quantization method for improving picture encoding/decoding efficiency.

The present invention also provides an apparatus performing a quantization method for improving picture encoding/decoding efficiency.

The present invention also provides an apparatus performing a quantization method for improving picture encoding/decoding efficiency.

Technical Solution

In an aspect, a picture decoding method is provided. The picture decoding method includes: decoding chrominance component quantization parameter offsets based on transform unit size information; and calculating chrominance component quantization parameter indices based on the decoded chrominance component quantization parameter offsets. The picture decoding method may further include calculating chrominance component quantization parameters according to the transform unit size information based on a mapping relationship between the chrominance component quantization parameter indices and the chrominance component quantization parameters. In the decoding of the chrominance component quantization parameter offsets based on the transform unit size information, the chrominance component quantization parameter offsets may be decoded for each picture unit of at least one of a sequence, a picture, and a slice. In the calculating of the chrominance component quantization parameters according to the transform unit size information based on the mapping relationship between the chrominance component quantization parameter indices and the chrominance component quantization parameters, the chrominance component quantization parameters according to the transform unit size information may be calculated as individual values or the same value as each other with respect to each chrominance component based on the mapping relationship between the chrominance component quantization parameter indices and the chrominance component quantization parameters. The chrominance component quantization parameter offsets may be values encoded according to the transform unit size information in a high level syntax structure. The chrominance component quantization parameter offsets may be calculated as the same value as each other or individual values according to the transform unit size information with respect to a plurality of chrominance components.

In an aspect, a picture decoding method is provided. The picture decoding method includes: decoding at least one of luminance component quantization parameter information and transform block size information; and determining chrominance component quantization parameters using a mapping table by using at least one of the luminance component quantization parameter information and transform block size information. The mapping table may be a mapping table in which mapping is made so that different chrominance component quantization parameters are calculated according to groups of each of at least one transform block size classified according to a size of a transform block based on the luminance component quantization parameter information.

In a still another aspect, a picture decoding apparatus is provided. The picture decoding apparatus includes: a chrominance component quantization parameter offset calculator decoding chrominance component quantization parameter offsets; a chrominance component quantization parameter index calculator calculating chrominance component quantization parameter indices based on the decoded chrominance component quantization parameter offsets; and a chrominance component quantization parameter calculator calculating chrominance component quantization parameters of a transform unit based on a mapping relationship between the chrominance component quantization parameter indices and the chrominance component quantization parameters. The chrominance component quantization parameter offset calculator may calculate the chrominance component quantization parameter offsets based on chrominance component quantization parameter offset information encoded for each picture unit of at least one of a sequence, a picture, and a slice. The chrominance component quantization parameter calculator may calculate the chrominance component quantization parameters according to transform unit size information as individual values or the same value as each other with respect to each chrominance component based on the mapping relationship between the chrominance component quantization parameter indices and the chrominance component quantization parameters. The chrominance component quantization parameter offsets may be values encoded according to the transform unit size information in a high level syntax structure. The chrominance component quantization parameter offsets may be calculated as the same value as each other or individual values according to the transform unit size information with respect to a plurality of chrominance components.

In a still another aspect, a picture decoding apparatus is provided. The picture decoding apparatus includes: a luminance component quantization parameter calculator calculating luminance component quantization parameter information; a transform block size information calculator calculating transform block size information; and a chrominance component quantization parameter calculator calculating chrominance component quantization parameters based on the luminance component quantization parameter calculated in the luminance component quantization parameter calculator and the transform block size information calculated in the transform block size information calculator. The chrominance component quantization parameter calculator may calculate the chrominance component quantization parameters by using a mapping table in which mapping is made so that different chrominance component quantization parameters are calculated according to groups of each of at least one transform block size classified according to a size of a transform block based on the luminance component quantization parameter information.

Advantageous Effects

As set forth, with the method of determining a chrominance component quantization parameter and the apparatus using the same according to the exemplary embodiment of the present invention, quantization is performed by applying different chrominance component quantization parameters according to a size of a transform unit to perform quantization, such that the picture may be efficiently quantized.

MODE FOR INVENTION

Figure 1:
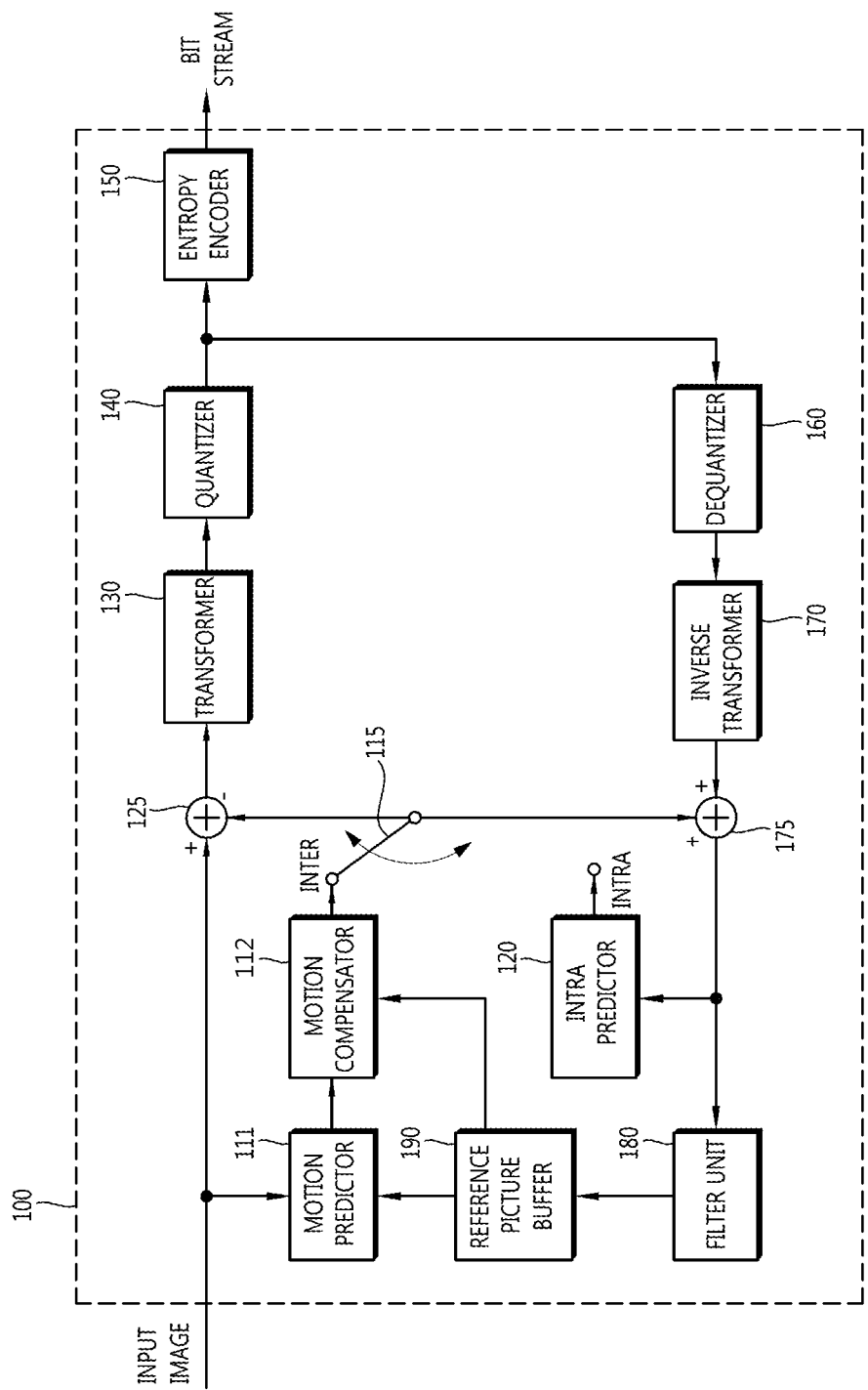
FIG. 1 is a block diagram showing a picture encoding apparatus according to an exemplary embodiment of the present invention.

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention. Throughout the accompanying drawings, the same reference numerals will be used to describe the same components.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, exemplary embodiments of the present invention will be described in more detail with reference to the accompanying drawings. Hereinafter, the same reference numerals will be used to describe the same components throughout the accompanying drawings, and an overlapped description of the same components will be omitted.

FIG. 1 is a block diagram showing a picture encoding apparatus according to an exemplary embodiment of the present invention.

Referring to FIG. 1, the picture encoding apparatus 100 includes a motion predictor 111, a motion compensator 112, an intra predictor 120, a switch 115, a subtracter 125, a transformer 130, a quantizer 140, an entropy encoder 150, a dequantizer 160, an inverse transformer 170, an adder 175, a filter unit 180, and a reference picture buffer 190.

The picture encoding apparatus 100 performs encoding on an input picture in an intra-mode or an inter-mode and outputs bit streams. Hereinafter, in an exemplary embodiment of the present invention, intra prediction may be used as the same meaning as intra prediction, and inter prediction may be used as the same meaning as inter prediction. In order to determined an optimal prediction method for a prediction unit, an intra prediction method and an inter prediction method may be selectively used for the prediction unit. The picture encoding apparatus 100 generates a prediction block for an original block of the input picture and then encodes a difference between the original block and the prediction block.

In the case of an intra prediction mode, the intra predictor 120 (or an intra predictor that may be used as a term having the same meaning as that of the intra predictor 120) performs spatial prediction by using pixel values of previously encoded blocks adjacent to a current block to generate a prediction block.

In an inter-prediction mode, the motion predictor 111 searches a region optimally matched with the input block in a reference picture stored in the reference picture buffer 190 during a motion prediction process to obtain a motion vector. The motion compensator 112 performs motion compensation by using the motion vector to generate the prediction block.

The subtracter 125 generates a residual block by a difference between the input block and the generated prediction block. The transformer 130 performs transform on the residual block to output a transform coefficient. Further, the quantizer 140 quantizes the input transform coefficient according to a quantization parameter to output a quantized coefficient. The entropy encoding unit 150 entropy-encodes the input quantized coefficient according to probability distribution to output the bit stream.

When the entropy-encoding is applied, symbols are represented by allocating a small number of bits to symbols having high generation probability and allocating a large number of bits to symbols having low generation probability, thereby making it possible to reduce a size of bit streams for the encoding target symbols. Therefore, the compression performance of the picture encoding may be improved through the entropy-encoding. The entropy-encoder 150 may use an encoding method such as exponential golomb, context-adaptive variable length coding (CAVLC), context-adaptive binary arithmetic coding (CABAC), or the like, for the entropy-encoding.

Since inter prediction encoding, that is, inter prediction encoding is performed at the time of encoding a picture, a current encoded picture needs to be decoded and stored in order to be used as a reference picture. Therefore, the dequantizer 160 dequantizes the quantized coefficient, and the inverse transformer 170 inversely transforms the dequantized coefficient to output a reconstructed residual block. The adder 175 adds the reconstructed residual block to the prediction block to generate a reconstructed block.

The reconstructed block passes through the filter unit 180 and the filter unit 180 may apply at least one of a deblocking filter, a sample adaptive offset (SAO), and an adaptive loop filter (ALF) to a reconstructed block or a reconstructed picture. The filter unit 180 may also be called an adaptive in-loop filter. The deblocking filter may remove block distortion generated at an inter-block boundary. The SAO may add an appropriate offset value to a pixel value in order to compensate for a coding error. The ALF may perform the filtering based on a comparison value between the reconstructed picture and the original picture. The reconstructed block passing through the filter unit 180 is stored in the reference picture buffer 190.

Figure 2:
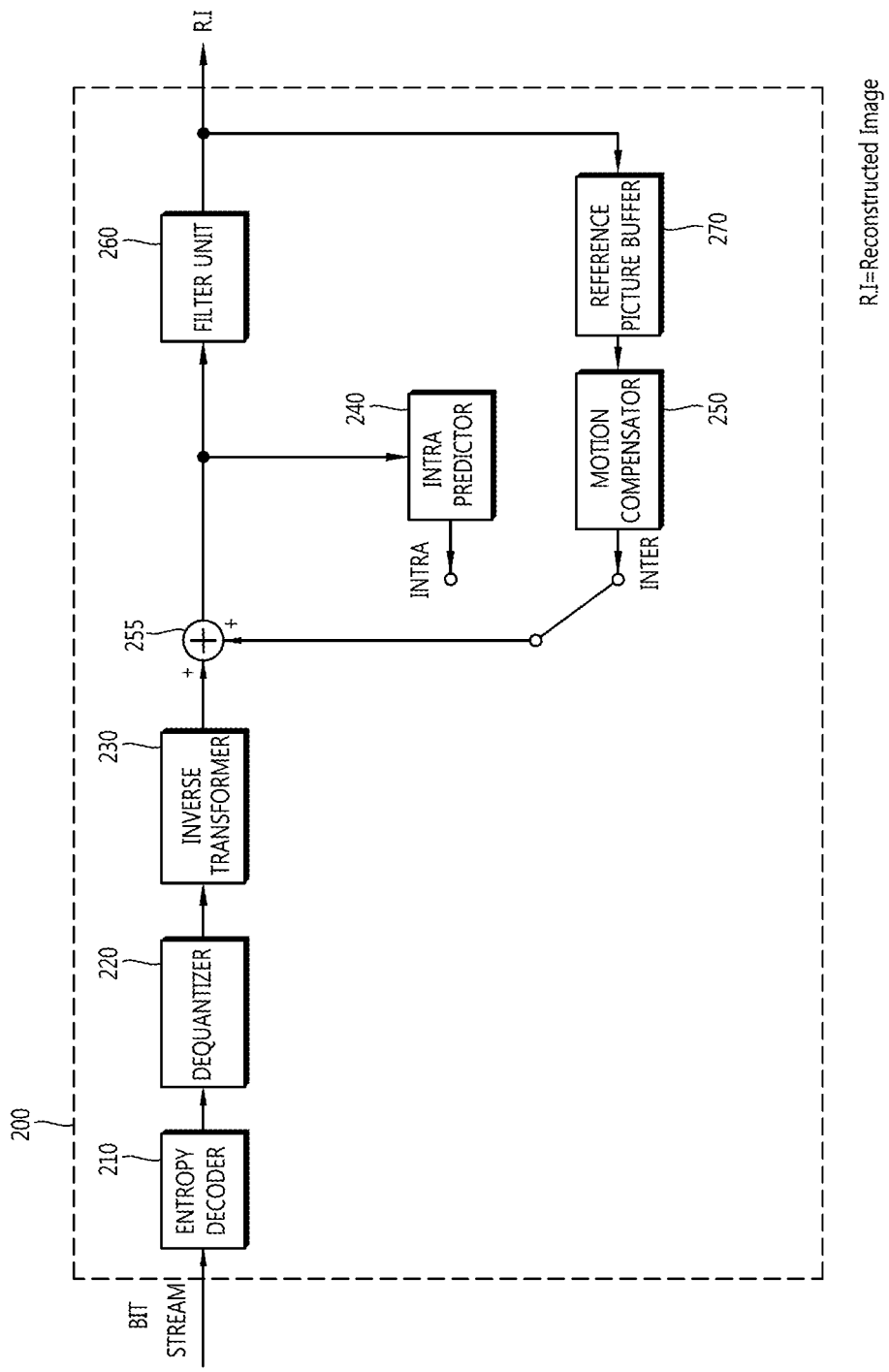
FIG. 2 is a block diagram showing a configuration of a picture decoding apparatus according to another exemplary embodiment of the present invention.

FIG. 2 is a block diagram showing a configuration of a picture decoding apparatus according to another exemplary embodiment of the present invention.

Referring to FIG. 2, the picture decoding apparatus 200 includes an entropy decoder 210, a dequantizer 220, an inverse transformer 230, an intra predictor 240, a motion compensator 250, a filter unit 260, and a reference picture buffer 270.

The picture decoding apparatus 200 receives the bit stream output from the encoder to perform decoding in the intra mode or the inter mode and outputs the reconstructed picture, that is, the recovered picture. In the case of the intra mode, a prediction block is generated by using an intra prediction method, and in the case of the inter mode, a prediction block is generated by using an inter prediction method. The picture decoding apparatus 200 obtains a reconstructed residual block from the received bit stream, generates the prediction block, and then adds the reconstructed residual block to the prediction block to generate the reconstructed block, that is, the recovered block.

The entropy-decoding unit 210 entropy-decodes the input bit stream according to the probability distribution to output the quantized coefficient. The quantized coefficient is dequantized in the dequantizer 220 and inversely transformed in the inverse transformer 230. The quantized coefficient may be dequantized/inversely transformed, such that the reconstructed residual block is generated.

When the entropy-decoding method is applied, symbols are represented by allocating a small number of bits to symbols having high generation probability and allocating a large number of bits to symbols having low generation probability, thereby making it possible to reduce a size of bit streams for each symbol. Therefore, the picture decoding compression performance may be improved through the entropy-decoding method.

In the case of the intra prediction mode, the intra predictor 240 (or an inter predictor) performs spatial prediction by using pixel values of previously decoded blocks adjacent to a current block to generate a prediction block.

In the case of the inter prediction mode, the motion compensator 250 performs the motion compensation by using the motion vector and the reference picture stored in the reference picture buffer 270 to generate the prediction block.

The reconstructed residual block and the prediction block are added to each other through the adder 255 and the added block passes through the filter unit 260. The filter unit 260 may apply at least one of the deblocking filter, the SAO, and the ALF to the reconstructed block or the reconstructed picture. The filter unit 260 outputs the reconstructed picture, that is, the recovered picture. The reconstructed picture may be stored in the reference picture buffer 270 to thereby be used for the inter prediction.

As a method for improving prediction performance of the encoding/decoding apparatus, there are a method of increasing accuracy of an interpolation picture and a method of predicting a difference signal. Here, the difference signal means a signal indicating a difference between an original picture and a prediction picture. In the present specification, the "difference signal" may be replaced by a "differential signal", a "residual block", or a "differential block" according to a context, which may be distinguished from each other by those skilled in the art without affecting the spirit and scope of the present invention.

As described above, hereinafter, a coding unit will be used as a term indicating an encoding unit in an exemplary embodiment of the present invention for convenience of explanation. However, the coding unit may be a unit of performing decoding as well as encoding. Hereinafter, a method of determining a chrominance component quantization parameter according to an exemplary embodiment of the present invention described with reference to FIGS. 3 to 10 may be implemented to be appropriate for functions of each modules described above with reference to FIGS. 1 and 2, and this encoder and decoder are included in the scope of the present invention. That is, a picture encoding method and a picture decoding method to be described below in the exemplary embodiment of the present invention may be performed in each component included in the picture encoder and the picture decoder described above with reference to FIGS. 1 and 2. The meaning of the component may include a software processing unit that may be performed through an algorithm as well as hardware meaning.

Hereinafter, although a method of calculating a chrominance component quantization parameter according to a size of a transform block by performing grouping according to the transform block size information will be described in the exemplary embodiments of the present invention, a simplified method of calculating a chrominance component quantization parameter such as a method of determining a chrominance component quantization parameter by using only a single mapping method or a method of setting a luminance component quantization parameter and a chrominance component quantization parameter to the same value as each other may also be used instead of a method of mapping different quantization parameters for each group according to the size of the transform block through any setting according to characteristics of pictures. Which of the methods of mapping a chrominance component quantization parameter will be used may be determined by flag information.

Figure 3:
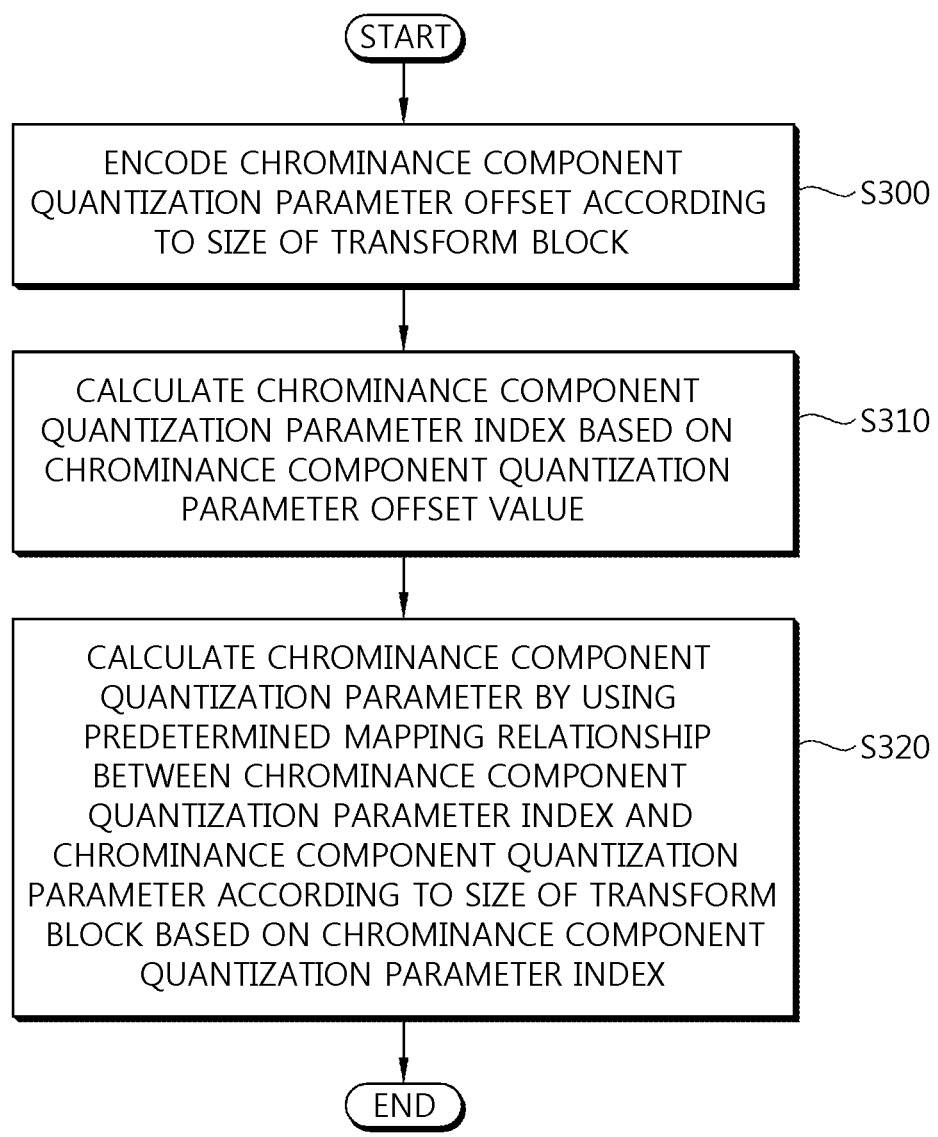
FIG. 3 is a flow chart showing a picture encoding method for determining a chrominance component quantization parameter according to the exemplary embodiment of the present invention.

FIG. 3 is a flow chart showing a picture encoding method for determining a chrominance component quantization parameter according to the exemplary embodiment of the present invention.

Referring to FIG. 3, a chrominance component quantization parameter offset is encoded according to a size of a transform block (S300).

Hereinafter, in the exemplary embodiment of the present invention, various methods may be used in order to encode a chrominance component quantization parameter offset. The chrominance component quantization parameter offset may be represented by syntax element information, numbers represented in syntax elements may indicate the size of the transform block, and Cb and Cr included in the syntax element may indicate for which chrominance component the quantization parameter offset is The syntax element, which is arbitrarily set for convenience, may be represented in other syntax element forms.

According to the exemplary embodiment of the present invention, the chrominance component quantization parameter offsets may be encoded/decoded into syntax element information included a high level syntax so that different offset are applied according to the size of the transform block. For example, the chrominance component quantization parameter offsets may be represented by the syntax element information included in a high level syntax structure such as a sequence parameter set (SPS), a picture parameter set (PPS), a slice header, or the like. The meaning that the different offsets are applied according to the size of the transform block is that groups are generated according to the size of the transform block by using a plurality of chrominance component quantization parameter offsets and different quantization parameters offset values are applied according to corresponding groups as well as that different offset information is applied to each size of the transform blocks. For example, the meaning that the different offsets are applied according to the size of the transform block may be that a first chrominance component quantization parameter offset is applied to transform blocks having 8×8 and 16×16 sizes and a second chrominance component quantization parameter offset is applied to transform blocks having 32×32 and 64×64 sizes. That is, in the method of determining a chrominance component quantization parameter according to the exemplary embodiment of the present invention, it is possible to apply different chrominance component quantization parameter offsets based on the transform block size information.

In the method of determining a chrominance component quantization parameter according to the exemplary embodiment of the present invention, the chrominance component quantization parameter offset is encoded in, for example, the SPS, thereby making it possible to apply different chrominance component quantization parameter offsets may be applied to each size of the transform blocks included in a sequence. With respect to transform blocks having different sizes, for example, 4×4, 8×8, 16×16, and 32×32 sizes, each chrominance component quantization parameter offset information may be encoded in the SPS through syntax element information such as sequence_chroma_qp_offset_4×4, sequence_chroma_qp_offset_8×8, sequence_chroma_qp_offset_16×16, or sequence_chroma_qp_offset_32×32.

In the method of determining a chrominance component quantization parameter according to another exemplary embodiment of the present invention, the chrominance component quantization parameter offset is encoded in the PPS, thereby making it possible to apply the same chrominance component quantization parameter offset to blocks in the picture for each size of the transform blocks. Chrominance component quantization parameter offset information according to different sizes of the transform blocks, for example, 4×4, 8×8, 16×16, and 32×32 sizes may be encoded in the SPS by using syntax element information such as picture_chroma_qp_offset_4×4, picture_chroma_qp_offset_8×8, picture_chroma_qp_offset_16×16, or picture_chroma_qp_offset_32×32.

In the method of determining a chrominance component quantization parameter according to another exemplary embodiment of the present invention, the chrominance component quantization parameter offset is encoded in the slice header, thereby making it possible to apply the same chrominance component quantization parameter offset to each size of the transform blocks included in a slice.

For each of the transform blocks having, for example, 4×4, 8×8, 16×16, and 32×32 sizes, the chrominance component quantization parameter offset information may be encoded in the slice header through a syntax element such as slice_chroma_qp_offset_4×4, slice_chroma_qp_offset_8×8, slice_chroma_qp_offset_16×16, or slice_chroma_qp_offset_32×32.

In the method of determining a chrominance component quantization parameter according to another exemplary embodiment of the present invention, the quantization parameter offsets applied to a plurality of chrominance components are used as the same value, thereby making it possible to apply the same offset information to each size of the transform blocks.

For example, chrominance component quantization parameter offsets for each of the Cr and Cb components may be encoded and used by a chroma_qp_offset value which is the same value.

According to another exemplary embodiment of the present invention, the quantization parameter offset for a single chrominance component may be encoded for each size of the transform blocks.

For example, the chrominance component quantization parameter offset for the Cr component may be encoded by chroma_qp_offset_cr, and the chrominance component quantization parameter offset for the Cb component may be encoded by chroma_qp_offset_cb.

In the method of determining a chrominance component quantization parameter according to another exemplary embodiment of the present invention, the chrominance component quantization parameter offsets for the plurality of chrominance components are used as the same value, thereby making it possible to perform encoding for each of a plurality of transform blocks.

For example, the chrominance component quantization parameter offsets for the chrominance components Cb and Cr of the transform blocks having 4×4 and 8×8 sizes may be encoded by a single syntax element (chroma_qp_offset_4×4_8×8), and the chrominance component quantization parameter offsets of the transform blocks having 16×16 and 32×32 sizes may be encoded by a single syntax element (chroma_qp_offset_16×16_32×32). That is, with respect to the chrominance components Cb and Cr, the block may be quantized by using the same chrominance component quantization parameter offset.

In the method of determining a chrominance component quantization parameter according to another exemplary embodiment of the present invention, a single chrominance component quantization parameter offset may be encoded for each size of the plurality of transform blocks.

For example, the chrominance component quantization parameter offsets for each of the chrominance components Cb and Cr of the transform blocks having 4×4 and 8×8 sizes may be encoded by syntax elements (chroma_qp_offset_4×4_8×8_cb and chroma_qp_offset_4×4_8×8_cr), and the chrominance component quantization parameter offsets of the transform blocks having 16×16 and 32×32 sizes may be encoded by syntax elements (chroma_qp_offset_16×16_32×32_cb and chroma_qp_offset_16×16_32×32_cr).

The above-mentioned methods are examples of methods of performing encoding by determining the chrominance component quantization parameter offsets so as to be different according to at least one of the size of the transform block and the chrominance component. It is also possible to encode the chrominance component quantization parameter offset of the transform block by combining the above-mentioned examples with each other.

A chrominance component quantization parameter index is calculated based on the chrominance component quantization parameter offset according to the size of the transform block (S310).

According to the exemplary embodiment of the present invention, a chrominance component quantization parameter may be determined based on the chrominance component quantization parameter offset information and the chrominance component quantization parameter index information calculated according to the chrominance component quantization parameter offset information, by using a mapping relationship predefined according to the size of the transform block. As described below, the chrominance component quantization parameter offset (chroma_qp_offset) according to the size of the transform block and a luminance component quantization parameter (luma_qp) are added to each other, thereby making it possible to calculate a chrominance component quantization parameter index (chroma_qp_index) according to the size of the transform block as represented by the following Equation 1. Here, the chrominance component quantization parameter offset may be calculated by various methods as described above in S300.

chroma_qp_index may be calculated based on the following Equation 1.

$$\text{chroma\_qp\_index} = \text{Clip3}(0, 51, \text{luma\_qp} + \text{chroma\_qp\_offset}) \quad \text{<Equation 1>}$$

Where Clip3 indicates a function of clipping a third parameter value so as to be a value between first and second parameter values.

The chrominance component quantization parameter index (chroma_qp_index) may determine chroma_qp, which is a chrominance component quantization parameter according to the size of the transform block, based on a mapping relationship of the following Tables 1 and 2. Here, the mapping relationships are present for each size of the transform blocks or a single mapping relationship may be shared in sizes of the plurality of transform blocks.

The chrominance component quantization parameter is determined by using the mapping relationship between the chrominance component quantization parameter index and the chrominance component quantization parameter according to the size of the transform block based on the calculated chrominance component quantization parameter index (S320).

The following Tables 1 and 2 show that chrominance component quantization parameters are calculated by using different mapping tables according to the size of the transform block.

TABLE 1

Mapping Relationship shared in Transform Blocks having 4 × 4, 8 × 8, 16 × 16, and 32 × 32 Sizes

| chroma_qp_index | <30 | | 30 | 31 | 32 | 33 | 34 | 35 | 36 | 37 | 38 | 39 | 40 | 41 | 42 | 43 | 44 | 45 | ... |
|---|---|---|---|---|---|---|---|---|---|---|---|---|---|---|---|---|---|---|---|
| chroma_qp | =chroma_qp_index | | 29 | 30 | 31 | 32 | 32 | 33 | 34 | 34 | 35 | 35 | 36 | 36 | 37 | 37 | 37 | 38 | ... |

TABLE 2

Mapping Relationship in Transform Block Having 32 × 32 Size

| chroma_qp_index | <30 | 30 | 31 | 32 | 33 | 34 | 35 | 36 | 37 | 38 | 39 | 40 | 41 | 42 | 43 | 44 | 45 | ... |
|---|---|---|---|---|---|---|---|---|---|---|---|---|---|---|---|---|---|---|
| chroma_qp | =chroma_qp_index | 31 | 32 | 33 | 34 | 35 | 36 | 37 | 38 | 38 | 39 | 39 | 40 | 40 | 41 | 41 | 42 | ... |

Table 1 is a table showing the same mapping relationship between the chrominance component quantization parameter index and the chrominance component quantization parameter shared in all of the sizes of the transform block, and Table 2 is a table a mapping relationship between the chrominance component quantization parameter index and the chrominance component quantization parameter applied only to the 32×32 transform block. That is, unlike Table 1, in Table 2, a mapping table differently applied for each size of the transform block is generated, thereby making it possible to calculate the chrominance component quantization parameter.

Hereinafter, in the exemplary embodiment of the present invention, a method of calculating a chrominance component quantization parameter for a transform block having a 16×16 size and a method of determining a chrominance component quantization parameter of a transform block in a picture unit will be mainly described for convenience of explanation. However, a method of determining a quantization parameter to be disclosed in the exemplary embodiment of the present invention is applied to all of methods of calculating a quantization parameter of a chrominance block based on information of a size of a transform block as well as the transform block having the 16×16 size. For example, the quantization parameter of the chrominance block may be calculated by using Table 1 for calculating the chrominance component quantization parameter with respect to the 4×4 block and the 8×8 block and Table 2 for calculating the chrominance component quantization parameter with respect to the 16×16 block and the 32×32 block, based on the size of the transform block. In addition, the chrominance component quantization parameter offset calculating the chrominance component quantization parameter is determined in another picture unit such as a sequence or a slice rather than the picture unit, thereby making it possible to determine the chrominance component quantization parameters of the transform blocks so as to be different.

Describing a method of calculating a quantization parameter for a transform unit having a 16×16 size in a picture unit by way of example, a chrominance component quantization parameter offset (picture_chroma_qp_offset_16×16) of the transform block having the 16×16 size and encoded in the PPS and a luminance component quantization parameter luma_qp are added to each other, thereby making it possible to determine a chrominance component quantization parameter index (chroma_qp_index_16×16) applied to the transform block having the 16×16 size as follows. The following Equation 2 indicates calculating quantization parameter index information according to the exemplary embodiment of the present invention.

$$\text{chroma\_}qp\text{\_index\_16} \times 16 = \text{Clip3}(0,51,\text{luma\_}qp+\text{picture\_chroma\_}qp\text{\_offset\_16} \times 16) \quad \text{<Equation 2>}$$

The following Table 3 is a table for calculating a chrominance component quantization parameter based on the chrominance component quantization parameter index information in the transform block having the 16×16 size. A chrominance component quantization parameter chroma_qp_16×16 may be determined according to the chrominance component quantization parameter index (chroma_qp_16×16) by using a mapping relationship in Table 3.

TABLE 3

Mapping Relationship in Transform Block Having 16 × 16 Size

| chroma_qp_index_16 × 16 | <30 | 30 | 31 | 32 | 33 | 34 | 35 | 36 | 37 | 38 | 39 | 40 | 41 | 42 | 43 | 44 | 45 | ... |
|---|---|---|---|---|---|---|---|---|---|---|---|---|---|---|---|---|---|---|
| chroma_qp_16 × 16 | =chroma_qp_index_16 × 16 | 29 | 30 | 31 | 32 | 32 | 33 | 34 | 34 | 35 | 35 | 36 | 36 | 37 | 37 | 37 | 38 | ... |

For example, in the case in which luma_qp is 38 and chroma_qp_offset_16×16 is 2, chroma_qp_index_16×16 becomes 40 according to Equation 2, and chroma_qp_16×16 becomes 36 according to Table 3.

According to another exemplary embodiment of the present invention, quantization parameters for each chrominance component Cb and Cr may be determined by using different mapping table for each size of transform blocks.

Hereinafter, a method of calculating a quantization parameter of a Cr component in a transform block having a 32×32 size will be described in the exemplary embodiment of the present invention for convenience of explanation. However, the same method may also be applied to transform blocks having other sizes and quantization parameters of other chrominance components, which will be included in the scope of the present invention. In addition, a mapping relationship between a chrominance component quantization parameter index and a chrominance component quantization parameter may present in plural according to a size of a transform block. However, only a single mapping relationship therebetween may also be present regardless of the size of the transform block.

For example, a chrominance component quantization parameter offset (chroma_qp_offset_32×32_cr) of a Cr component in a transform block having a 32×32 size and a luminance component quantization parameter (luma_qp) are added to each other, thereby making it possible to calculate a chrominance component quantization parameter index (chroma_qp_index_32×32_cr) of the Cr component applied to the transform block having the 32×32 size.

$$\text{chroma\_}qp\text{\_index\_32} \times 32\_cr = \text{Clip3}(0,51,\text{luma\_}qp+\text{chroma\_}qp\text{\_offset\_32} \times 32\_cr) \quad \text{<Equation 3>}$$

After the chrominance component quantization parameter index is calculated based on Equation 3, the chrominance component quantization parameter chroma_qp_32×32_cr of the Cr component may be determined according to the chrominance component quantization parameter index (chroma_qp_index_32×32_cr) of the Cr component by using the mapping relationship of Table 4.

TABLE 4

Mapping Relationship of Chrominance Component Quantization Parameter of Cr component in Transform Block Having 32 × 32 Size

| | | | | | | | | | | | | | | | | | |
|---|---|---|---|---|---|---|---|---|---|---|---|---|---|---|---|---|---|
| chroma_qp_index32 × 32_cr | <30 | | 30 | 31 | 32 | 33 | 34 | 35 | 36 | 37 | 38 | 39 | 40 | 41 | 42 | 43 | 44 | 45 ... |
| chroma_qp_32 × 32_cr | =chroma_qp_index_32 × 32_cr | 29 | 30 | 31 | 32 | 32 | 33 | 34 | 34 | 35 | 35 | 36 | 36 | 37 | 37 | 37 | 38 ... |

For example, in the case in which luma_qp is 31 and chroma_qp_offset_32×32_cr is −1, chroma_qp_index_32×32_cr becomes 30, and chroma_qp_32×32_cr becomes 29.

According to another exemplary embodiment of the present invention, quantization parameters for a plurality of chrominance components are calculated as a single value by using the same table, thereby making it possible to determine a chrominance component quantization parameter for a transform block.

Although a transform block having a 4×4 size and a 8×8 size will be disclosed in the following exemplary embodiment of the present invention for convenience of explanation, the present invention may also be applied to transform blocks other than the transform block having the 4×4 size and the 8×8 size. In addition, a mapping relationship between a chrominance component quantization parameter index and a chrominance component quantization parameter may present in plural according to a size of a transform block. However, only a single mapping relationship therebetween may also be present regardless of the size of the transform block.

For example, a chrominance component quantization parameter offset (chroma_qp_offset_4×4_8×8) of the transform block having the 4×4 size and the 8×8 size and a luminance component quantization parameter (luma_qp) are added to each other, thereby making it possible to determine a chrominance component quantization parameter index (chroma_qp_index_4×4_8×8) applied to the transform block having the 4×4 size and the 8×8 size by using the following Equation 4.

chroma_$qp$_index_4×4_8×8=Clip3(0,51,luma_$qp$+
chroma_$qp$_offset_4×4_8×8) <Equation 4>

A chrominance component quantization parameter (chroma_qp_4×4_8×8) applied to the transform block having the 4×4 size and the 8×8 size may be determined according to the chrominance component quantization parameter index by using a mapping relationship as shown in the following Table 5 based on the calculated chrominance component quantization parameter index.

Figure 4:
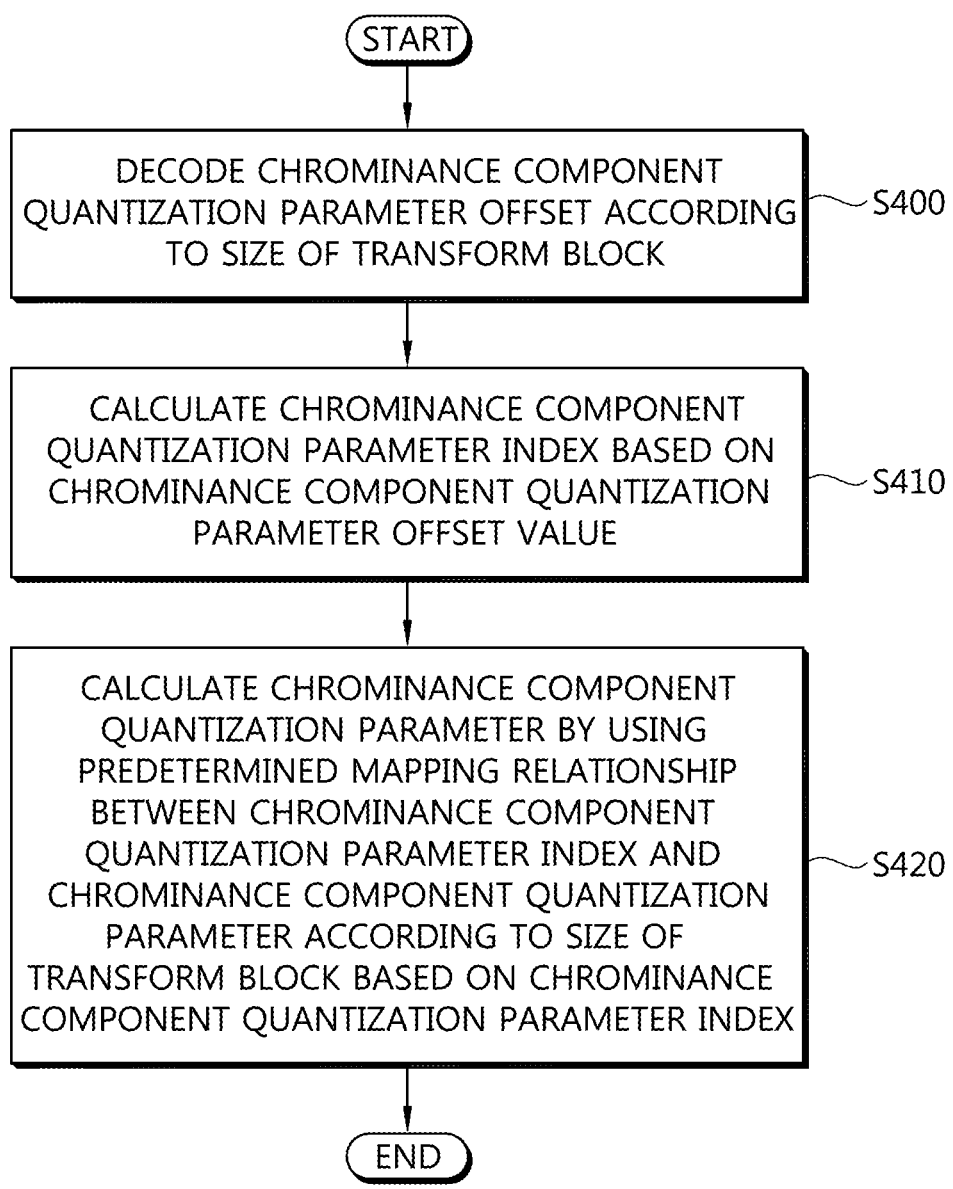
FIG. 4 is a flow chart showing a picture decoding method for determining a chrominance component quantization parameter according to the exemplary embodiment of the present invention.

Referring to FIG. 4, a chrominance component quantization parameter offset is decoded according to a size of a transform block (S400).

In the decoding step, a chrominance component quantization parameter offset value calculated by using the above-mentioned S300 may be decoded. The chrominance component quantization parameter offset value may be encoded through the SPS, the PPS, and the slice header, and in the decoding step, transform block size information in a picture and chrominance component information are determined, thereby making it possible to determine chrominance component quantization parameter offset information, similar to the encoding step. For example, in the case in which the chrominance component quantization parameter offset information is encoded according to a size of a transform unit in the PPS in the encoding step, the chrominance component quantization parameter offset information according to the size of the transform unit in the PPS may be decoded.

According to another exemplary embodiment of the present invention, in the decoding step, the quantization parameter may be calculated based on the quantization parameter offset information transmitted for each size of the transform blocks with respect to each of the Cr and Cb components in the encoding step. The meaning that application is made for each size of the transform blocks is that each of the transform blocks having different sizes belongs to each of a plurality of groups, such that the same quantization parameter may be applied to each of the plurality of groups. For example, transform blocks having 8×8 and 16×16 sizes are set to a first group, and transform blocks having 32×32 and 64×64 sizes are set to a second group, thereby making it possible to set the same chrominance component quantization parameter offset in each group. For example, a syntax element chroma_qp_offset_32×32_cr in which the quantization parameter offset information of the Cr component applied to the transform block having the 32×32 size is encoded may be decoded, and chrominance component quantization parameter index information may be calculated

TABLE 5

Mapping Relationship in Transform Block Having 4 × 4 Size and 8 × 8 Size

| | | | | | | | | | | | | | | | | | |
|---|---|---|---|---|---|---|---|---|---|---|---|---|---|---|---|---|---|
| chroma_qp_index_4 × 4_8 × 8 | <30 | | 30 | 31 | 32 | 33 | 34 | 35 | 36 | 37 | 38 | 39 | 40 | 41 | 42 | 43 | 44 | 45 ... |
| chroma_qp_4 × 4_8 × 8 | =chroma_qp_index_4 × 4_8 × 8 | 29 | 30 | 31 | 32 | 32 | 33 | 34 | 34 | 35 | 35 | 36 | 36 | 37 | 37 | 37 | 38 ... |

For example, in the case in which luma_qp is 32 and chroma_qp_offset_4×4_8×8 is 5, chroma_qp_index_4×4_8×8 becomes 37 according to Equation 4, and chroma_qp_4×4_8×8 becomes 34 according to the mapping relationship in Table 5.

FIG. 4 is a flow chart showing a picture decoding method for determining a chrominance component quantization parameter according to the exemplary embodiment of the present invention.

by using the decoded and calculated chrominance component quantization parameter offset information and the decoded luminance component quantization parameter information. The chrominance component quantization parameter may be calculated by using a predetermined mapping relationship between the chrominance component quantization parameter index and the chrominance component quantization parameter based on the calculated chrominance component quantization parameter index information.

According to still another exemplary embodiment of the present invention, quantization parameter offset values applied to Cb and Cr may be set to be the same as each other, and the set quantization parameter offset values may be differently applied to each size of the transform blocks. The meaning that application is made for each size of the transform blocks is that each of the transform blocks having different sizes belongs to each of a plurality of groups, such that the same quantization parameter may be applied to each of the plurality of groups. For example, transform blocks having 8×8 and 16×16 sizes are set to a first group, and transform blocks having 32×32 and 64×64 sizes are set to a second group, thereby making it possible to set the same chrominance component quantization parameter offset in each group.

A chrominance component quantization parameter index is calculated based on the chrominance component quantization parameter offset value (S410).

The quantization parameter offset value may be calculated as a quantization parameter index value based on the above-mentioned predetermined Equation. In order to calculate the chrominance component quantization parameter index, a method of adding the chrominance component quantization parameter offset value to a luminance component quantization parameter value may be used.

According to the exemplary embodiment of the present invention, the chrominance component quantization parameter may be calculated by using a mapping relationship between a luminance component quantization parameter and a chrominance component quantization parameter in consideration of a size of a transform block based on the luminance component quantization parameter, unlike the above-mentioned exemplary embodiments.

A chrominance component quantization parameter is calculated in consideration of a size of a transform block (S510).

For example, the chrominance component quantization parameter may be determined by using a mapping relationship predefined according to the size of the transform block. For example, the chrominance component quantization parameter (chroma_qp) may be determined according to the size of the transform block by using a mapping relationship used in the following Table. Here, a plurality of mapping relationships may be present for each size of the transform blocks or chroma_qp may be determined by sharing a single mapping relationship in sizes of the plurality of transform blocks.

TABLE 6

| Mapping Relationship in Transform Block Having 4 × 4 Size and 8 × 8 Size | | | | | | | | | | | | | | | | | |
|---|---|---|---|---|---|---|---|---|---|---|---|---|---|---|---|---|---|
| chroma_qp_index | <30 | 30 | 31 | 32 | 33 | 34 | 35 | 36 | 37 | 38 | 39 | 40 | 41 | 42 | 43 | 44 | 45 ... |
| chroma_qp | =chroma_qp_index | 31 | 31 | 31 | 32 | 32 | 32 | 33 | 33 | 33 | 34 | 34 | 34 | 35 | 35 | 35 | 36 ... |
| Mapping Relationship in Transform Block Having 32 × 32 Size | | | | | | | | | | | | | | | | | |
| chroma_qp_index | <30 | 30 | 31 | 32 | 33 | 34 | 35 | 36 | 37 | 38 | 39 | 40 | 41 | 42 | 43 | 44 | 45 ... |
| chroma_qp | =chroma_qp_index | 31 | 32 | 33 | 34 | 35 | 36 | 37 | 38 | 38 | 39 | 39 | 40 | 40 | 41 | 41 | 42 ... |
| Mapping Relationship in Transform Block Having 16 × 16 Size | | | | | | | | | | | | | | | | | |
| chroma_qp_index | <30 | 30 | 31 | 32 | 33 | 34 | 35 | 36 | 37 | 38 | 39 | 40 | 41 | 42 | 43 | 44 | 45 ... |
| chroma_qp | =chroma_qp_index | 29 | 30 | 31 | 32 | 32 | 33 | 34 | 34 | 35 | 35 | 36 | 36 | 37 | 37 | 37 | 38 ... |

For example, the decoded chrominance component quantization parameter offset information and the decoded luminance component quantization parameter information (luma_qp) are added to each other, thereby making it possible to calculate the chrominance component quantization parameter index information applied to a transform unit having a 16×16 size. That is, in S410, the quantization parameter index may be calculated based on the quantization parameter offset value calculated based on various methods described above in S400.

The chrominance component quantization parameter is determined by using the mapping relationship between the chrominance component quantization parameter index and the chrominance component quantization parameter according to the size of the transform block based on the chrominance component quantization parameter index (S420).

The chrominance component quantization parameter may be calculated based on a mapping relationship between the chrominance component quantization parameter index and the chrominance component quantization parameter by using the chrominance component quantization parameter index information calculated in S410. This mapping relationship may be similarly defined and used as a lookup table or an equation in the encoding and decoding steps.

Figure 5:
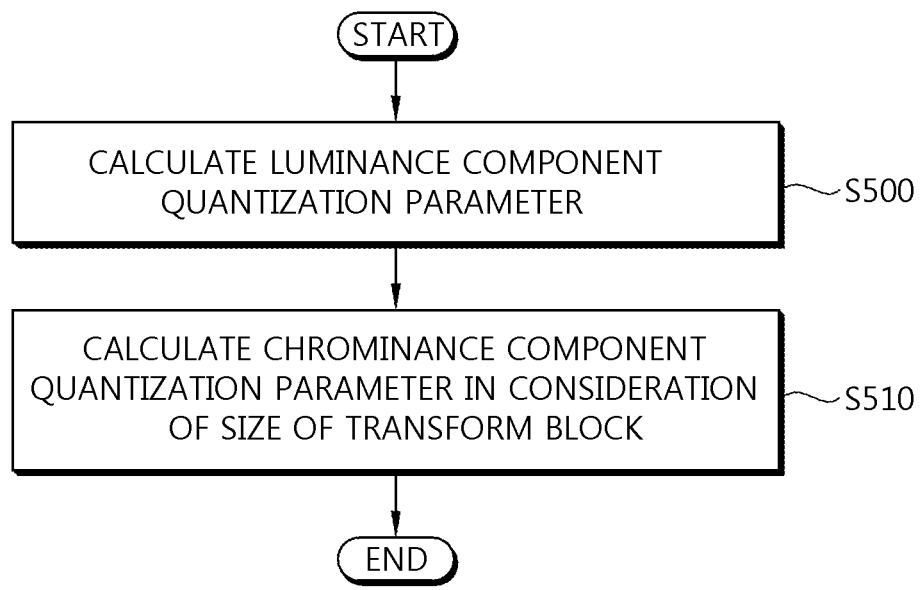
FIG. 5 is a flow chart showing a picture encoding method for determining a chrominance component quantization parameter according to the exemplary embodiment of the present invention.

FIG. 5 is a flow chart showing a picture encoding method for determining a chrominance component quantization parameter according to the exemplary embodiment of the present invention.

Referring to FIG. 5, a luminance component quantization parameter is calculated (S500).

Figure 6:
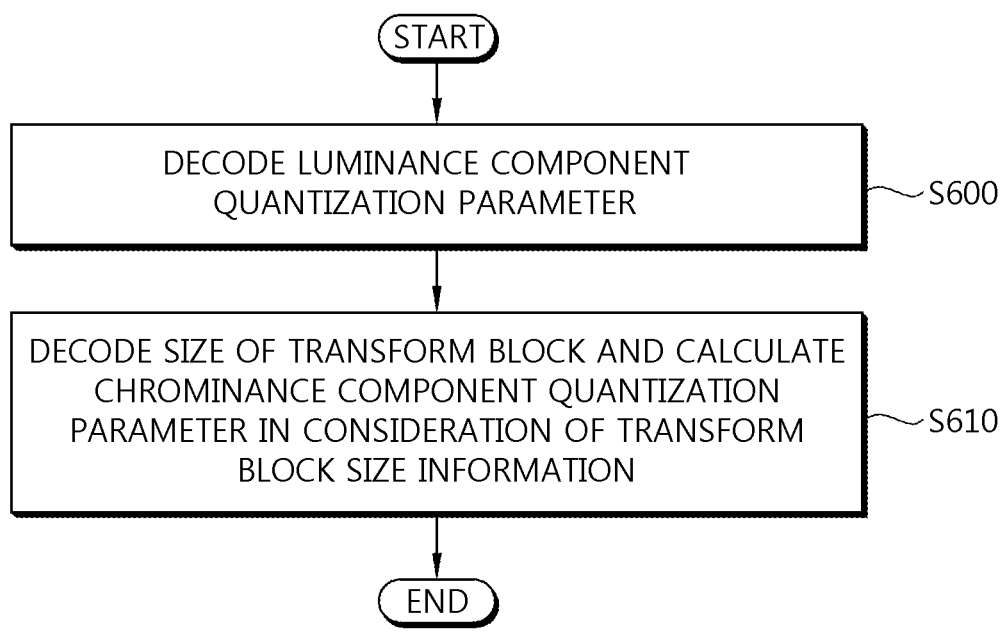
FIG. 6 is a flow chart showing a picture decoding method for determining a chrominance component quantization parameter according to the exemplary embodiment of the present invention.

Referring to FIG. 6, the chrominance component quantization parameter according to the chrominance component quantization parameter index may be calculated according to the size of the transform block. That is, the chrominance component quantization parameter of a current transform block may be calculated by using different mapping tables according to the size of the transform block.

A simplified method of calculating a chrominance component quantization parameter such as a method of determining a chrominance component quantization parameter by using only a single mapping method or a method of setting a luminance component quantization parameter and a chrominance component quantization parameter to the same value as each other may also be used instead of a method of mapping different quantization parameters for each group according to the size of the transform block through any setting according to characteristics of pictures. Which of the methods of mapping a chrominance component quantization parameter will be used may be determined by flag information.

FIG. 6 is a flow chart showing a picture decoding method for determining a chrominance component quantization parameter according to the exemplary embodiment of the present invention.

Referring to FIG. 6, luminance component quantization parameter information is decoded (S600).

The encoded luminance component quantization parameter information is decoded. According to the exemplary embodiment of the present invention, the chrominance component quantization parameter may be calculated by using a mapping table based on a luminance component quantization parameter and transform unit size information.

The transform block size information is decoded, and the chrominance component quantization parameter is calculated in consideration of the transform block size information (S610).

As described above, the decoder may determine the chrominance component quantization parameter may be determined by using, for example, a mapping relationship predefined according to the size of the transform block, similar to the encoder. For example, the decoder may determine the chrominance component quantization parameter chroma_qp according to the size of the transform block by using the mapping relationship between a luminance component and a chrominance component as shown in Table 6, similar to the encoder. Here, a plurality of mapping relationships may be present for each size of the transform blocks or chroma_qp may be determined by sharing a single mapping relationship in sizes of the plurality of transform blocks.

Figure 7:
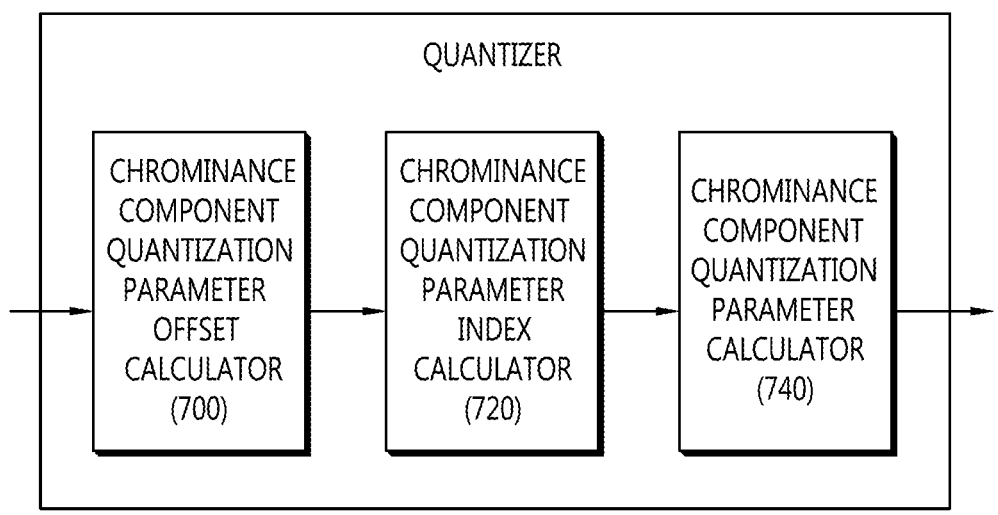
FIG. 7 is a conceptual diagram showing a portion of a picture encoder according to the exemplary embodiment of the present invention.

FIG. 7 is a conceptual diagram showing a portion of a picture encoder according to the exemplary embodiment of the present invention.

Referring to FIG. 7, the quantizer of the picture encoder may include a chrominance component quantization parameter offset calculator 700, a chrominance component quantization parameter index calculator 720, and a chrominance component quantization parameter calculator 740.

The chrominance component quantization parameter offset calculator 700 may determine a chrominance component quantization parameter offset which is to perform quantization on a chrominance component. As described above, the component quantization parameter offsets may be determined to be different values according to a size of a transform unit to which a quantization parameter is applied or be determined to be the same value as each other regardless of the size of the transform unit.

The chrominance component quantization parameter index calculator 720 may calculate a chrominance component quantization parameter index based on the chrominance component quantization parameter offset value. In order to calculate the chrominance component quantization parameter index, the chrominance component quantization parameter offset and the luminance component quantization parameter may be used.

The chrominance component quantization parameter calculator 740 may calculate a chrominance component quantization parameter based on a mapping relationship between the chrominance component quantization parameter index and the chrominance component quantization parameter.

Figure 8:
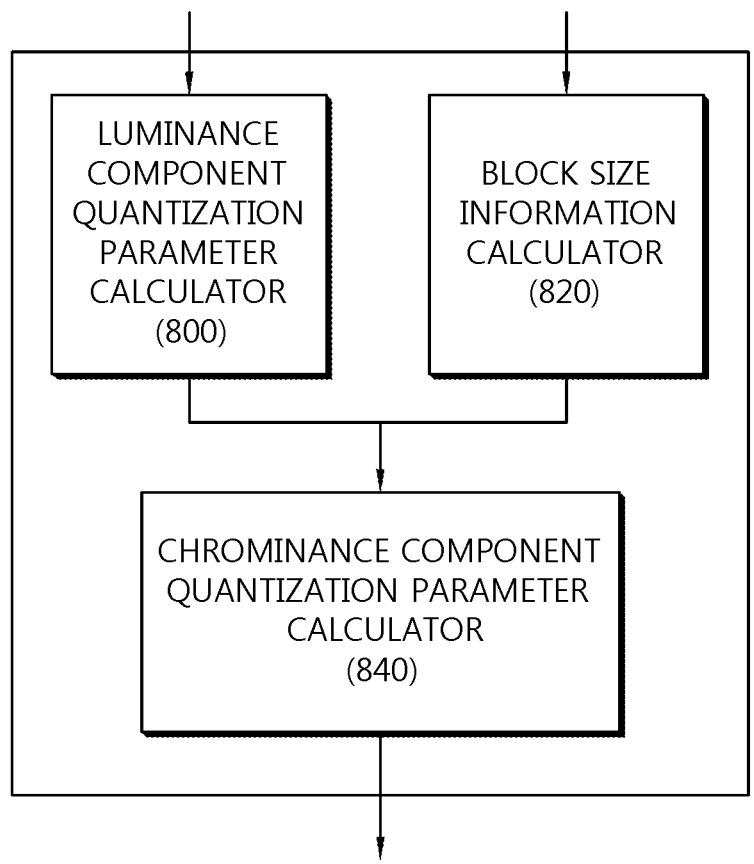
FIG. 8 is a conceptual diagram showing a portion of a picture encoder according to the exemplary embodiment of the present invention.

FIG. 8 is a conceptual diagram showing a portion of a picture encoder according to the exemplary embodiment of the present invention.

Referring to FIG. 8, the chrominance component quantization parameter may also be calculated by using the method disclosed in FIG. 5 rather than the above-mentioned method. In order to calculate chrominance component quantization parameter, the picture encoder may include a luminance component quantization parameter calculator 800, a block size information calculator 820, and a chrominance component quantization parameter calculator 840.

The luminance component quantization parameter calculator 800 may calculate a luminance component quantization parameter in order to determine the chrominance component quantization parameter.

The block size information calculator 820 may calculate block size information so as to be used together with the luminance component quantization parameter information in order to determine the chrominance component quantization parameter.

After the luminance component quantization parameter calculator 800 calculates the luminance component quantization parameter information and the block size information calculator 820 calculates the block size information, the chrominance component quantization parameter calculator 840 may calculate chrominance component quantization parameter information based on the calculated luminance component quantization parameter information and block size information. The chrominance component quantization parameter may be calculated by using the lookup table showing the mapping relationship between the luminance component and the chrominance component according to the size of the transform block or a predetermined equation.

Figure 9:
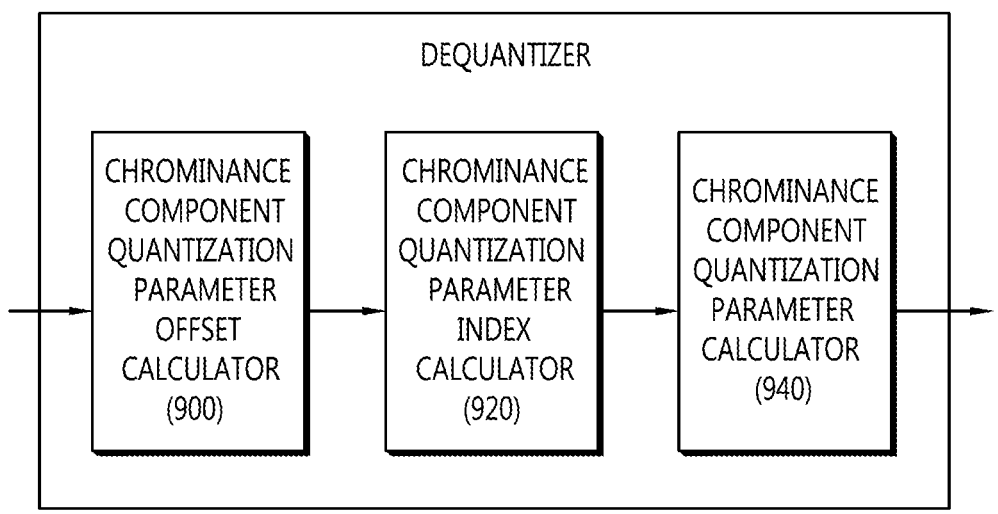
FIG. 9 is a conceptual diagram showing a portion of a picture decoder according to an exemplary embodiment of the present invention.

FIG. 9 is a conceptual diagram showing a portion of a picture decoder according to an exemplary embodiment of the present invention.

Referring to FIG. 9, the dequantizer of the picture encoder may include a chrominance component quantization parameter offset calculator 900, a chrominance component quantization parameter index calculator 920, and a chrominance component quantization parameter calculator 940.

The chrominance component quantization parameter offset calculator 900 may calculate a value obtained by decoding the chrominance component quantization parameter offset value encoded in the encoder. As described above, the chrominance component quantization parameter offset values may be different according to the size of the transform unit and be the same as each other regardless of the size of the transform unit.

The chrominance component quantization parameter index calculator 920 may calculate a chrominance component quantization parameter index based on the chrominance component quantization parameter offset value. The chrominance component quantization parameter index value may be calculated by the same method as the method of calculating the chrominance component quantization parameter index.

The chrominance component quantization parameter calculator 940 may calculate a chrominance component quantization parameter by using the same mapping relationship between the chrominance component quantization parameter and the chrominance component quantization parameter index as that in the encoder based on the chrominance component quantization parameter index value.

Figure 10:
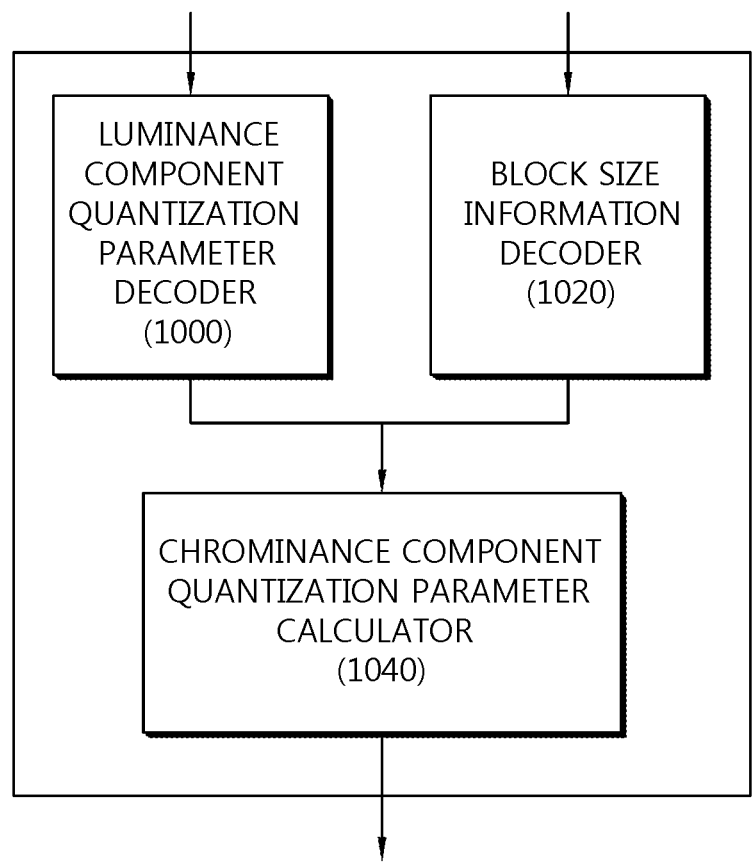
FIG. 10 is a conceptual diagram showing a portion of a picture decoder according to an exemplary embodiment of the present invention.

FIG. 10 is a conceptual diagram showing a portion of a picture decoder according to an exemplary embodiment of the present invention.

Referring to FIG. 10, the dequantizer of the picture decoder may include a luminance component quantization parameter decoder 1000, a transform block size information decoder 1020, and a chrominance component quantization parameter information calculator 1040.

The luminance component quantization parameter decoder 1000 may calculate a luminance component quantization parameter in order to dequantize a luminance component of a block.

The transform block size information decoder 1020 may calculate transform block size information for calculating a chrominance component quantization parameter.

The chrominance component quantization parameter information calculator 1040 may calculate a chrominance component quantization parameter based on the luminance component quantization parameter calculated in the luminance component quantization parameter decoder 1000 and the transform block size information calculated in the transform block size information decoder 1020. In order to calculate the chrominance component quantization parameter, a lookup table or equation information for calculating the chrominance component quantization parameter based on the luminance component quantization parameter and the transform block size information may be used, similar to the encoder.

Although it is assumed in FIGS. 7 to 10 that a series of operations for calculating the quantization parameter are performed in the quantizer and the dequantizer, these operations may also be performed in other components rather than the quantizer and the dequantizer, which is included in the scope of the present invention.

Hereinabove, although the present invention have been described with reference to the exemplary embodiments thereof, those skilled in the art will appreciate that various modifications, additions and substitutions are possible, without departing from the scope and spirit of the invention as disclosed in the accompanying claims.

The invention claimed is:

1. A video decoding apparatus comprising:
an inverse-quantizer configured to determine a size of a quantization group, the quantization group being a group of a plurality of transform blocks to which a same chrominance component quantization parameter is applied, configured to calculate the chrominance component quantization parameter to be applied to the determined quantization group, and configured to inverse-quantize transform coefficients of a transform block included in the determined quantization group by using the calculated chrominance component quantization parameter, wherein the inverse-quantizer comprises:
a chrominance component quantization parameter index calculator configured to calculate a chrominance component quantization parameter index by using a luminance component quantization parameter, a first chrominance component quantization parameter offset of a picture level and a second chrominance component quantization parameter offset of a slice level, wherein the first chrominance component quantization parameter offset is extracted from a picture parameter set of a bitstream, and the second chrominance component quantization parameter offset is extracted from a slice header of the bitstream; and
a chrominance component quantization parameter calculator configured to calculate the chrominance component quantization parameter based on the chrominance component quantization parameter index.

2. The video decoding apparatus of claim 1, wherein the quantization group includes the transform blocks with different sizes.

3. The video decoding apparatus of claim 1, wherein the chrominance component quantization parameter index is calculated by adding the first chrominance component quantization parameter offset and the second chrominance component quantization parameter offset to the luminance component quantization parameter.

* * * * *